L. A. CRANDALL.
METAL CUTTING APPARATUS.
APPLICATION FILED DEC. 26, 1919.
1,370,882.
Patented Mar. 8, 1921.
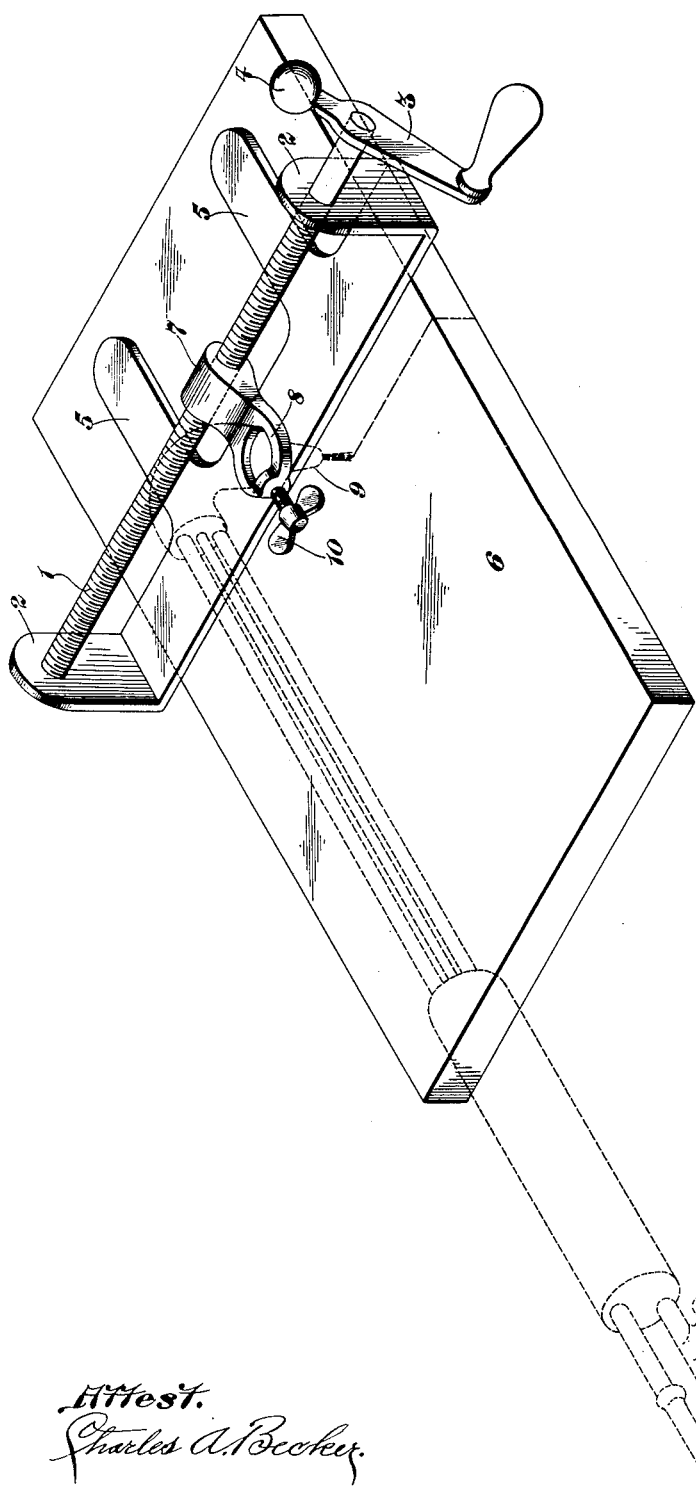

UNITED STATES PATENT OFFICE.

LEONARD ALLEN CRANDALL, OF McCOOK, NEBRASKA.

METAL-CUTTING APPARATUS.

1,370,882.

Specification of Letters Patent.

Patented Mar. 8, 1921.

Application filed December 26, 1919. Serial No. 347,315.

*To all whom it may concern:*

Be it known that I, LEONARD A. CRANDALL, a citizen of the United States of America, and a resident of the city of McCook, in the county of Redwillow, State of Nebraska, have invented certain new and useful Improvements in Metal-Cutting Apparatus, of which the following is a specification.

This invention has for its prime object the provision of portable, simple and inexpensive means for moving an oxygen-acetylene blow torch along a predetermined line when employed for cutting metal, thereby preventing irregularity in the cut which inevitably occurs when the workman relies merely upon his steadiness of hand.

Referring to the perspective of the apparatus shown in the accompanying drawing, 1 indicates a threaded rod which is projected through the upturned extremities of a frame 2 and rotated by crank 3 preferably having a weighted extension 4.

Said frame is provided with lugs 5 across which a pig of lead or other weight (not shown) may be placed in order to retain the apparatus in any desired position upon the metal to be severed (as for example upon plate 6) and mounted upon said rod is a specially designed member comprising a threaded portion 7 and a ring 8 through which the nozzle 9 of the blow torch is inserted, said nozzle being retained within said ring by set-screw 10.

It will be understood that when the apparatus is in use the rear portion of the torch is supported by the workman so that the flame issuing from its nozzle will be directed vertically upon the metal to be severed substantially as illustrated and upon turning crank 3 either to right or left the nozzle-holding member will be moved toward one or the other extremity of rod 1 along a line parallel throughout with the adjacent edge of frame 2.

Having thus fully described the construction of the apparatus and the manner of its use, what I claim as new and desire to secure by Letters-Patent is:—

1. Metal cutting apparatus comprising a frame having a plate adapted to rest upon the metal to be cut, a threaded rod suspended above said plate, a blow-torch, a threaded member mounted for travel upon said rod adapted to engage said torch and rotatable about the axis of said rod, whereby said torch may be positioned on either side of said plate, and means for turning said rod.

2. Metal cutting apparatus comprising a frame, a threaded rod suspended within said frame, a blow-torch, a threaded member mounted for travel upon said rod adapted to engage said torch, means for rotating said rod, and lugs extending from said frame adapted to lie against the metal to be cut, whereby the frame may be secured against movement.

3. Metal cutting apparatus comprising a frame having a plate adapted to rest upon the metal to be cut, a threaded rod suspended above said plate, a blow-torch, a threaded member mounted for travel upon said rod having an aperture for the reception of said torch and rotatable about the axis of said rod, whereby said torch may be positioned on either side of said plate, means for fastening said torch within said aperture, and means for turning said rod.

4. Metal cutting apparatus comprising a frame, a threaded rod suspended within said frame, a blow-torch, a threaded member mounted for travel upon said rod having an aperture for the reception of said torch, means for fastening the latter within said aperture, means for rotating said rod, and lugs extending from said frame adapted to lie against the metal to be cut, whereby the frame may be secured against movement.

LEONARD ALLEN CRANDALL.

Witnesses:
Mrs. A. ANTON,
MORTON L. SEARCH.